United States Patent [19]

Lyu

[11] Patent Number: 5,801,777
[45] Date of Patent: Sep. 1, 1998

[54] DEVICE AND METHOD FOR DECODING DIGITAL VIDEO DATA

[75] Inventor: Hwa-Young Lyu, Seoul, Rep. of Korea

[73] Assignee: LG Electronics Inc., Seoul, Rep. of Korea

[21] Appl. No.: 708,774

[22] Filed: Sep. 5, 1996

[30] Foreign Application Priority Data

Sep. 5, 1995 [KR] Rep. of Korea ............ 28977/1995

[51] Int. Cl.⁶ ............................................. H04N 7/00
[52] U.S. Cl. ..................... 348/409; 348/354; 348/390;
348/392; 348/400; 348/403; 348/405; 348/413;
348/446; 348/458
[58] Field of Search ........................... 348/416, 384,
348/390, 409, 400, 392, 408, 419, 403,
405, 413, 415, 446, 452, 458

[56] References Cited

U.S. PATENT DOCUMENTS

5,646,693  7/1997  Cismas .......................... 348/409

Primary Examiner—Mark R. Powell
Assistant Examiner—Quenedy Pierre-Louis
Attorney, Agent, or Firm—Loeb & Loeb LLP

[57] ABSTRACT

A device for decoding digital video data including a variable length decoder (VLD), an inverse discrete cosine transform (DCT) converting part, a movement compensating part, and a first storage device for repeated production of first video frame data responsive to a control signal display format. A second storage device is also employed for reordering and storing second video frame data produced by adding the data from the inverse DCT converting part and the movement compensating part repeatedly and repeated production of stored data in response to a control signal produced according to the display format. A switching device is further included that selectively produces the second video frame data, composed of reordered and repeated production of the first video frame data in response to a selection control signal and a controlling device provides control signals and display format information. A converting data device converts data to a picture size, employing interlaced to progressive or progressive to interlaced conversion, for producing frame data matched to the display format, the data having a frame rate thereof converted in the switching device in response to the format information from the controlling device and a synchronizing signal.

27 Claims, 6 Drawing Sheets

540*1920 60Hz int(field) → 540*1920 60Hz int

FIG.4e

1080*1920 30Hz int(frame) → 540*1920 60Hz int

FIG.4f

1080*1920 24Hz prog → 540*1920 60Hz int

FIG.4g

1080*1920 30Hz prog ⟶ 720*1280 prog

FIG.4h

1080*1920 24Hz prog ⟶ 720*1280 prog

DEVICE AND METHOD FOR DECODING DIGITAL VIDEO DATA

FIELD OF THE INVENTION

This application corresponds to Korean Patent No. 28977/1995, which is hereby incorporated by reference.

The present invention relates to a digital video decoding device and, more particularly, to a device for decoding digital video data which can reduce the frame memory size needed in a format conversion of the digital video data, and a method for decoding the same.

DISCUSSION OF THE RELATED ART

In general, a video decoder decodes images in various formats. Therefore, in order to display an image on a limited area of the display, a format conversion is required. The conversion operation in conversion of a format includes the frame rate conversion, picture size conversion, from an interlaced to progressive conversion (or progressive to an interlaced conversion) and the like.

The frame rate conversion means a number of frames transferred, i.e., displayed on a screen per second; taking the human vision characteristics into account, in transmission of video signals, such as TV signals, an appropriate number of frames are transferred in each second. In this instant, in case of a current color TV system, 30 frames are transferred per second in an NTSC system, and 25 frames are transferred per second in a PAL or SECOM system. Since methods, such as frame repetition is used for a frame conversion, a buffer memory having a size over 1 frame is required for temporary storage of a frame data. The frame repetition is repetitive scanning of a decoded frame on the screen.

The interlaced to progressive conversion or progressive to interlaced conversion is a conversion from a interlaced signal to a progressive signal, or progressive signal to a interlaced signal, in case a decoded video signal and a display video format are different in their manners of scanning. Basically, the interlaced to progressive conversion includes double scanning, interpolation of two adjacent scanning lines, and repetition of an immediately prior field value, for which the movement compensation method may be used for improvement of a picture quality. The progressive to interlaced conversion includes a method of sampling a top or bottom field from each frame. In the interlaced to progressive conversion or progressive to interlaced conversion, a ½ frame sized buffer is required for temporary storage of one field.

The picture size conversion is a conversion of a picture size in case the size of a decoded video signal is different from the size of the display image. For this picture size conversion, a filter utilizes line buffers employed in the interpolation or substraction.

A conventional format conversion will be explained with reference to the attached drawings.

Figure 1:
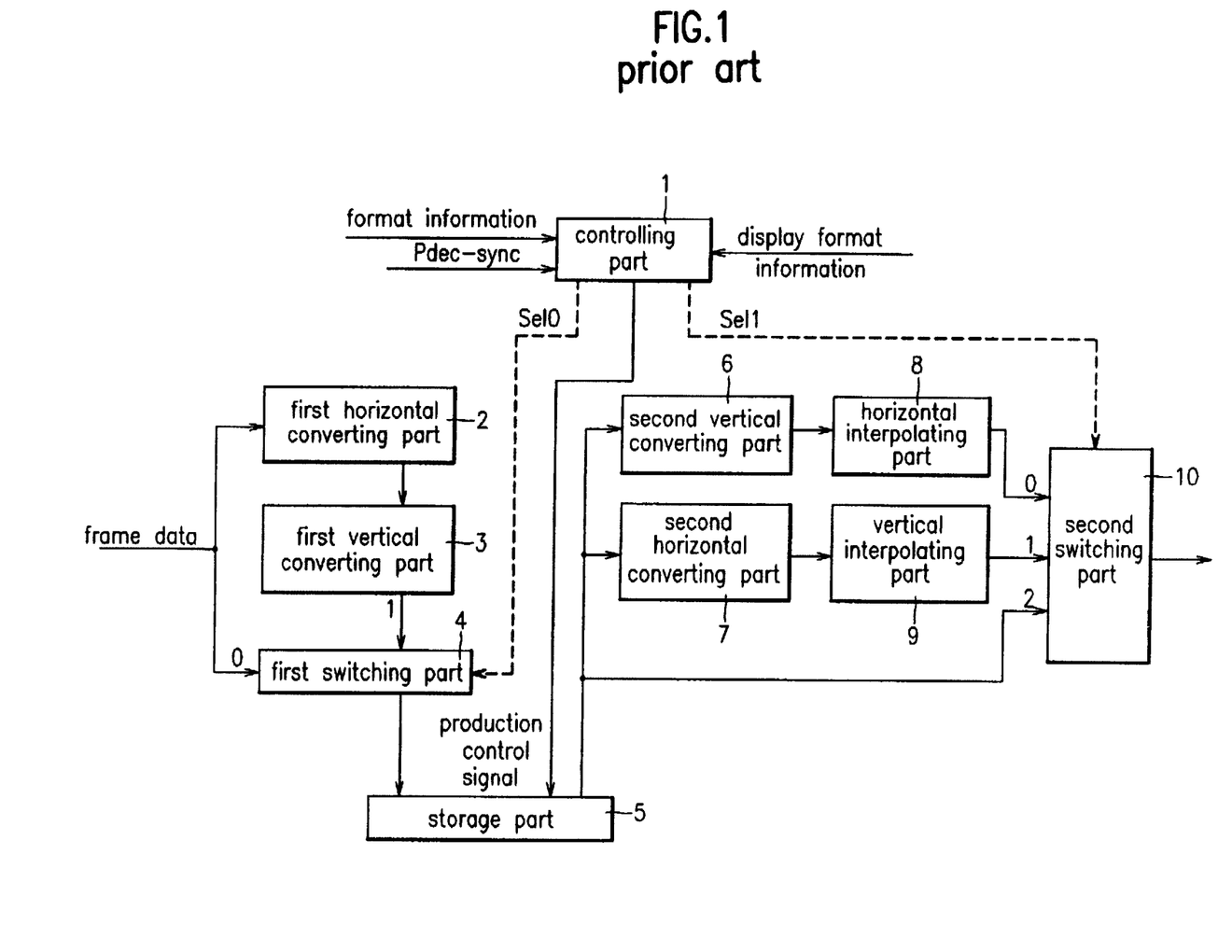
FIG. 1 illustrates a block diagram of a format conversion part for use in display in a conventional digital video data decoding device.
Figure 2:
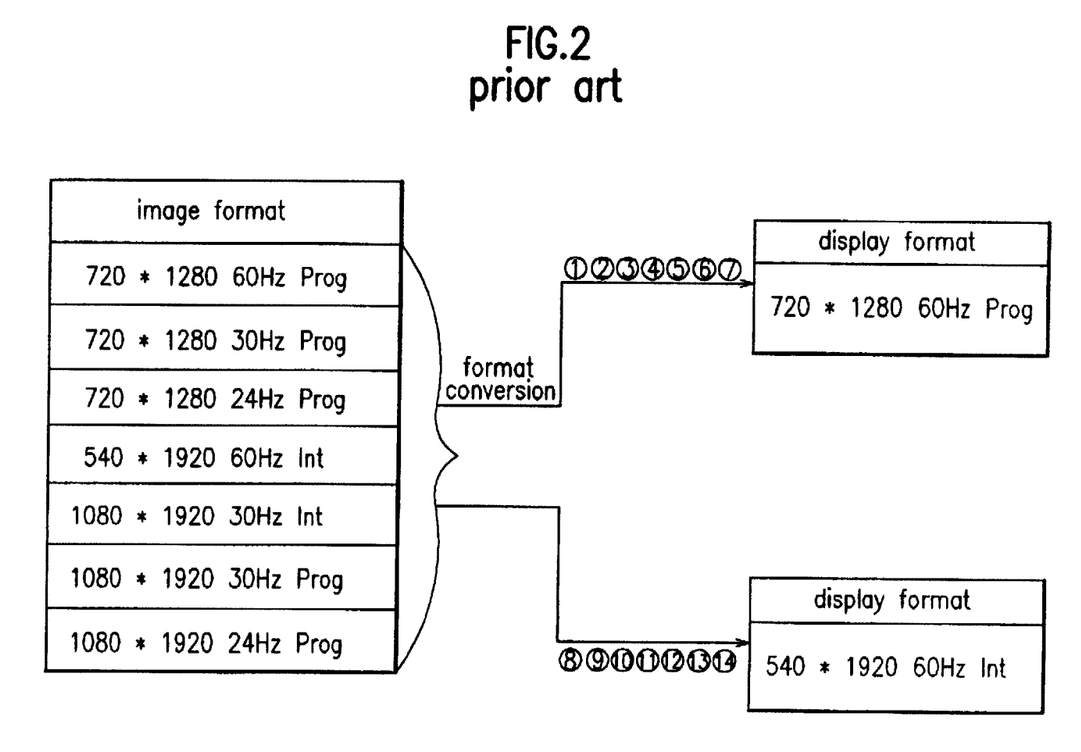
FIG. 2 is an example of image formats converted and displayed by the conventional digital video data decoding device.

FIG. 1 illustrates a block diagram of a format conversion part for displaying images in a conventional digital video data decoding device, and FIG. 2 illustrates an example of a format converted and displayed video format in the conventional digital video data decoding device.

Referring to FIG. 1, the conventional format conversion part includes a controlling part 1 for generating first, and second selecting signals Sel0 and Sel1 in response to format information, display format information and Pdec-sync, for selecting a path according to a format conversion, a first horizontal conversion part 2 and a first vertical conversion part 3 for primary conversion of a received decoded frame data in horizontal and vertical directions in succession for picture size conversion, a first switching part 4 for outputting the frame data primary converted by the first selecting signal Sel0 from the controlling part 1 or the received frame data, a storage part 5 for buffering the output data and making a frame conversion and a conversion between a progressive scanning and an interlaced scanning, a second vertical converting part 6 for secondary vertical conversion of the data from the storage part 5, a horizontal interpolating part 8 for horizontal interpolation of the secondary vertical converted data, a second horizontal converting part 7 for secondary horizontal conversion of the data from the storage part 5 for a picture size conversion, a vertical interpolating part 9 for vertical interpolation of the secondary converted data, and a second switching part 10 for selective outputting of the data from the horizontal interpolating part 8, vertical interpolating part 9 and storage part 5 in response to the second selecting signal Sel1 from the controlling part 1.

The operation of the format conversion part having the aforementioned system will be explained with reference to FIG. 2, taking, as an example, the format conversions for the Grand Alliance HDTV suggested 6 image formats, and 2 display formats of 60 Hz progressive scanning and interlaced scanning.

Referring to FIG. 2, in case a [720×1280 60 Hz Prog] image format is to be converted into a [720×1280 60 Hz Prog] display format (case 1), the controlling part 1 selects the first selecting signal "0" for the [720×1280 60 Hz Prog] image. The selected data, i.e., a data identical to the received image format is stored in the storage part 5 through the first switching part 4. The image format stored in the storage part 5 is applied to the second switching part 10 in response to an output control signal from the controlling part 1. The applied image format is displayed through the second switching part 10 in response to the second selecting signal "2" from the controlling part 1. In this instant, the first, and second selection signals "0" and "2" of the controlling part 1 are selected because the received image format and display image format are the same as to display as it is without any format conversion.

In FIG. 2 case 3, when a [720×1280 24 Hz Prog] is to be converted into a [720×1280 60 Hz Prog] display format, as before, the controlling part 1 selects the first, and second selection signals "0" and "2". However, in this case, because of a difference in their frame rates, one frame is repeatedly produced two times and the other frame is repeatedly produced three times, to convert it into the [720×1280 60 Hz Prog] image format. The one frame is produced three times and the other frame is produced two times because the production ratio of the image formats, i.e., the ratio between the received image format and the display image format is 2:5.

In case of FIG. 2 case 5, when a [1080×1920 30 Hz Int] is to be converted into a [720×1280 60 Hz Prog] display format, the controlling part 1 in FIG. 1 selects "1" as the first selection signal and "2" as the second selection signal. That is, of the received image format, the 1080 scanning lines are converted into 720 scanning lines by the first horizontal converting part 2, and the 1920 scanning lines are converted into 1280 scanning lines, therefore, interlaced scanning is converted into progressive scanning. Then, the converted image format is stored in the storage part 5 temporarily and transferred to the second switching part 10 in response to an output controlling signal from the controlling part 1. The image format transferred to the second switching part 10 is selectively presented in response to the second selection signal "2" from the controlling part 10. The converted image format is produced repeatedly to make the frame rate conversion.

In FIG. 2 case 5, when a [1080×1920 30 Hz Int] is to be converted into a [540×1920 60 Hz Int] display format, the controlling part 1 selects "0" as the first selection signal and "2" as the second selection signal, to convert the frame size, and rate.

However, in the conventional format conversion, the independent procession of the video decoding and the format conversion requires a large amount of additional memory for the format conversion, which increases the cost.

SUMMARY OF THE INVENTION

Accordingly, the present invention is directed to a device and method for decoding digital video data that substantially obviates one or more of the problems due to limitations and disadvantages of the related art.

An object of the present invention is to provide a device for decoding digital video data in which a video decoding memory is controlled to appropriately match a format conversion in conducting the repetitive conversion part without performing the video decoding and format conversion independently, thereby reducing the amount of additional memory required.

Another object of the present invention is to provide a decoding method which corresponds to the device for decoding digital video data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for decoding digital video data, employs a Variable Length Decoding (VLD), an inverse Discrete Cosine Transform converting part and a movement compensating part, first storage means for repeated production of a first video frame data in response to a control signal display format information, a second storage means for reordering and storing second video frame data produced by adding the data from the inverse DCT converting part and the movement compensating part and repeated production of the stored data in response to a control signal according to a display format, switching means for selective production of the second video frame data, which is the reordered and repeated production of the first video frame data in response to a selection control signal. Controlling means is employed for providing respective control signals and the display format information. Furthermore, means are utilized for converting data to a picture size employing interlaced to progressive or progressive to interlaced conversion for producing frame data matched to the display format, the data having a frame rate thereof converted in the switching means in response to the format information from the controlling means and a synchronizing signal.

An additional aspect of the invention employs a device for decoding a digital video data, comprised of a variable length decoder (VLD), an inverse discrete cosine transform (DCT) converting part, a movement compensating part and a first controlling part for controlling the device to conduct a decoding operation. A first storage part is also employed for storing the received video data in the VLD and repeated production of the B picture frame data in response to a control signal produced according to a display format information from the first controlling part. Thereafter, second and third storage parts for storage and production of the decoded data along with repeated production of I or P picture frame data in response to a control signal is produced according to the display format information from the first controlling part is employed. Furthermore, a first switching part is performs selective production of data reordered in the second and third storage parts in accordance with to decoding data taken from the inverse DCT converting part, the movement compensating part, and the control signal from the first controlling part. A format conversion part for subjecting data to a picture size conversion via either an interlaced to progressive or progressive to interlaced conversion for producing frame data matched to a display format takes place, the data having a frame rate thereof converted in the first switching part in response to the display format information from the first controlling part and a synchronizing signal from the format conversion part.

Another aspect of the present invention, there is provided a method for decoding a digital video data in a decoding device having a Video Buffering Verifier (VBV) buffer and a frame memory, including the steps of comparing an image format of the received video data and the display image format, re-decoding the frame data from the VBV buffer in case it is found to be a B frame as a result of the comparison in response to an output controlling signal, repeated production of the prior frame data decoded and stored in the frame memory in case it is found to be an I or P frame as the result of the comparison, and converting the frame rate of the produced frame data to match to the display image format in decoding the converted frame data.

A further aspect of the present invention is a method for decoding digital video data in a digital video data decoding device having a variable length decoder (VLD), an inverse discrete cosine transform (DCT) converting part and movement compensating part. The temporary storage and repeated production of a first video frame data 19 is in response to a control signal produced according to display format information. This is followed by reordering and storing second video frame data which is multiplied data of the data from the inverse DCT converting part and the movement compensating part and repeated production of the stored data in succession in response to a control signal produced according to a display format when original image format information is not in conformity with the display image format information. Next, producing video frame data is selected from the first video frame data and the reordered and repeatedly and successively produced second video frame data, in response to a selection control signal in conversion of the frame rate. The process then performs the steps of subjecting the selected, produced and frame rate converted data to a frame size conversion and an interlaced to progressive or progressive to interlaced conversion according to a synchronizing signal from the format conversion part and the display format information for producing frame data matched to the display format.

It is also understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
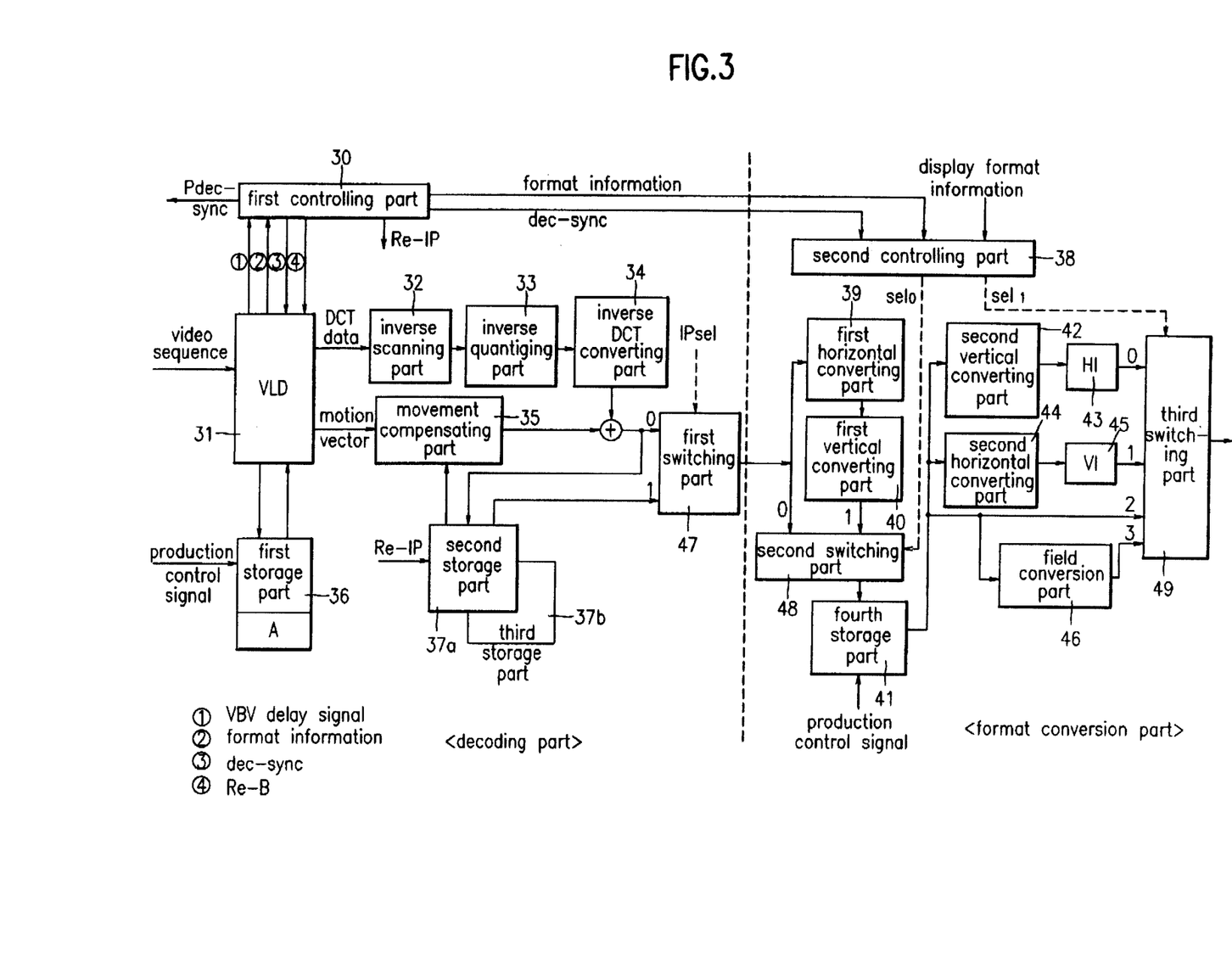
FIG. 3 illustrates a block diagram of a device for decoding digital video data in accordance with the present invention; and, FIGS. 4a–4h illustrate format conversions for respective embodiments done by the device for decoding digital video data in accordance with the present invention.

FIG. 3 illustrates a block diagram of a device for decoding digital video data in accordance with the present invention, and FIGS. 4a–4h illustrate format conversions for respective embodiments done by the device for decoding digital video data in accordance with the present invention.

Referring to FIG. 3, the device for decoding a digital video data includes a first controlling part 30 for controlling the entire system so that the decoding operation of the decoding device is carried out according to a display format, a VLD 31 for subjecting the received video data to variable length decoding, an inverse scanning part 32 for inverse scanning a DCT video data variable decoded in the VLD 31, an inverse quantizing part 33 for subjecting data from the inverse scanning part 32 to an inverse quantization, an inverse DCT converting part 34 for subjecting the data from the inverse quantizing part 33 to an inverse DCT conversion. The device further includes a movement compensation part 35 for movement compensation of the video data received according to the motion vector from the VLD 31, a first storage part 36 for buffering and storing received, variable length coded data in the VLD 31 and repeated production of B frame data in response to a repetition control signal B pictures (Re-B) according to the display format information from the first controlling part 30, second and third storage parts 37a and 37b for storing and producing frame data obtained by adding the data from the inverse DCT converting part 34 and the data from the movement compensation part 35 and repeated production of I and P frame data in response to repetition control I or P picture control signals (Re-IP) according to the display format information from the first controlling part 30, a first switching part 47 for producing a data selected from decoding data from the inverse DCT converting part 34, the movement compensation part 35, and data from the second and third storage parts 37a and 37b produced by the control signal Re-IP from the first controlling part 30, and a format conversion part for subjecting the frame data frame converted in the first switching part 47 by the format information from the controlling part 30 and the synchronizing signal dec-sync for the format conversion, to a picture size conversion and interlaced to progressive or vice versa conversion, thereby to produce frame data according to the display format.

The first storage part 36 is additionally provided with a buffer (A part in FIG. 3) to cope with any overflow incurred in redecoding of the B frame.

The format conversion part includes a second controlling part 38 for producing first and second selection signals $Sel_0$ and $Sel_1$. The signals are produced according to the display format in response to the image format information obtained from the first controlling part 30 in the video decoding part and utilizes the synchronizing signal dec-sync for the format conversion. A first horizontal converting part 39 and a first vertical converting part 40 provides the primary conversion to the picture size conversion of the received image format in the horizontal and vertical directions respectively. A second switching part 48 for producing the data selected from the data obtained from the first horizontal and vertical converting parts 39 and 40 and the data obtained from the first switching part 47 in response to the first selection signal $Sel_0$. A fourth storage part 41 is utilized for storing the frame data from the second switching part 48 and the interlaced to progressive or progressive to interlaced conversion of the data, according to the display format. Additionally, a second vertical converting part 42 and a second horizontal interpolating part (HI) 43 is employed for the vertical conversion and the horizontal interpolation of the frame data from the fourth storage part 41 respectively. A second horizontal converting part 44 and a second vertical interpolating part (VI) 45 is utilized for the horizontal reduction and vertical interpolation of the frame data from the fourth storage part 41 respectively. Also, a field converting part 46 for field conversion (Even⇌Odd) of the frame data from the fourth storage part for the progressive to interlaced or interlaced to progressive conversion of the frame data from the fourth storage part 41 is employed. A third switching part 49 produces data selected from the horizontal interpolating part 43, the vertical interpolating part 45, the fourth storage part 41 and the field converting part 46 in response to the second control signal $Sel_1$ from the second controlling part 38 is utilized.

The aforementioned device for decoding digital video data of the present invention implements, in case of decoding received video data, in its regular decoding operation frame data according to the image format information of the received video data and the display format information when the received image format is identical to the display format. In case of a format conversion, redecoding of the frame data reproduced from the first storage part 36, in case of a B frame, to suit the frame rate conversion by using different synchronizing signals, and, in the I or P frame cases, decoding is through a repeated production of the decoded frame data from the second and third storage parts 37a and 37b, and converting to a frame rate to suit to the display format, whereby the device of the present invention can reduce a frame memory size required for the field conversion. That is, taking the frame rate conversion into account, if the video decoding part conducts a decoding process using an internal memory, the additional memory for the frame conversion is no longer required. Accordingly, with only ½ the frame buffer for interlaced to progressive or progressive interlaced conversions and some line buffers for the frame size conversion, the format conversion function can be implemented.

The operation of the device for decoding a digital video data of the present invention will be explained in detail.

A VBV delay signal is a decoding delay signal for preventing an under or overflow from the first storage part 36, a Pdec-sync is a decoding synchronizing signal for regular video decoding, and a dec-sync is a decoding synchronizing signal for a decoding in a format conversion. A Re-IP and Re-B are repetitive signals for an I/P (Intra Predictive) frame and B (Bidirectionally Predictive) frame.

In case of I and P, as the decoded prior data is stored the second, and third storage parts 37a and 37b in the movement compensation part 35, these frame data are produced. In case of B, B code data decoded immediately before remains in the first storage part 36, it is redecoded. The first storage part 36 is provided with the additional buffer A for preventing an overflow during the redecoding. Since compressed code data is stored in the first storage part 36, the size of the first storage part 36 is very small compared to the frame unit. The IP Sel signal selects the paths for the B picture from the movement compensation part 35 and the I and P pictures from the second and third storage parts 37a and 37b, to determine whether the decoded frame data should be produced directly or reordered data should be produced.

The aforementioned format conversion of the present invention will be explained taking, as examples, the format conversions of the case of the GAHDTV adopted 6 image formats and [60 Hz Prog, Int] 2 display formats which use the MPEG II Main Profile-High Level.

Figure 4A:
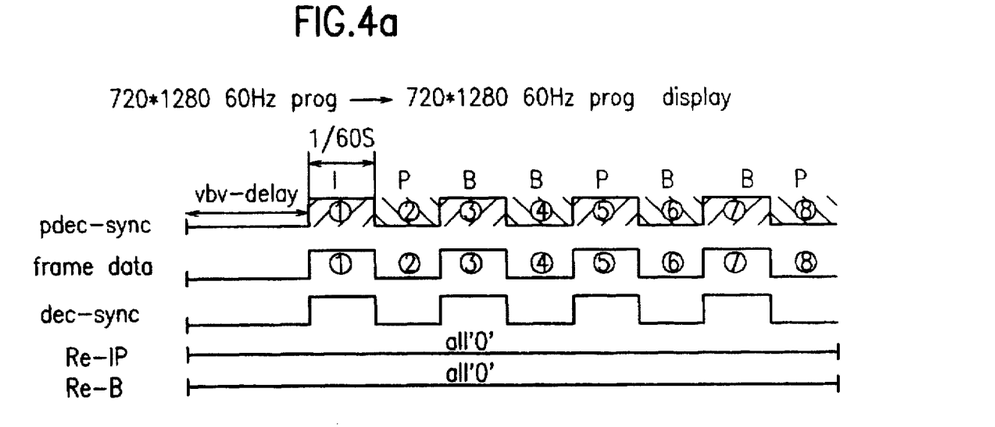

FIG. 4a illustrates a case where frame data in a [720×1280 60 Hz Prog] image format is displayed without any format conversion, decoded in a regular manner in response to the Pdec-sync. In this instance, the first selection signal is "0", and the second selection signal is "2". That is, the first switching part 47 selects the received and unconverted image format, and the selected image format is temporarily stored in the fourth storage part 41 and applied to the third switching part 49 in response to an output control signal from the second controlling part 38. In this instance, the image format is a format unconverted, i.e., a format of which the received image format and display image format are the same, the second controlling part 38 selects "2" as the second control signal for a regular operation. The hatched portions represent portions in which one frame data is decoded.

Figure 4B:
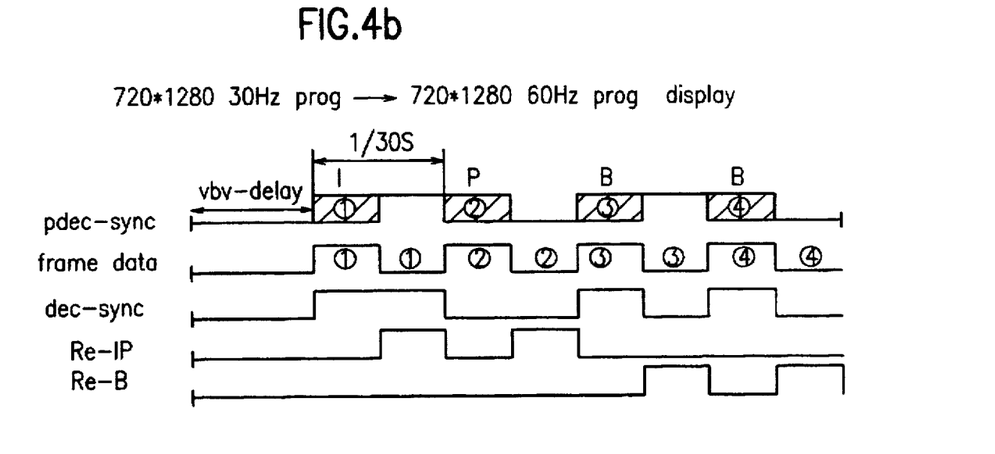

FIG. 4b illustrates a conversion from a [720×1280 30 Hz Prog] image format into a [720×1280 60 Hz Prog] display format of the frame data. The video decoding part decodes repetitively for the frame rate conversion. Since the video decoding part has a system capable of decoding the same size 60 Hz image, the video decoding part has the capability with respect to time to redecode or read in a 30 Hz image repetitively from a memory for the repetitive production required in decoding 30 Hz image, because although the amounts of compressed one frame code data for 60 Hz and 30 Hz are different, the numbers of operation are the same. In this case, the size of a buffer required for the format conversion part is zero. In this instance, the first control signal is 0, and the second control signal is two.

Figure 4C:
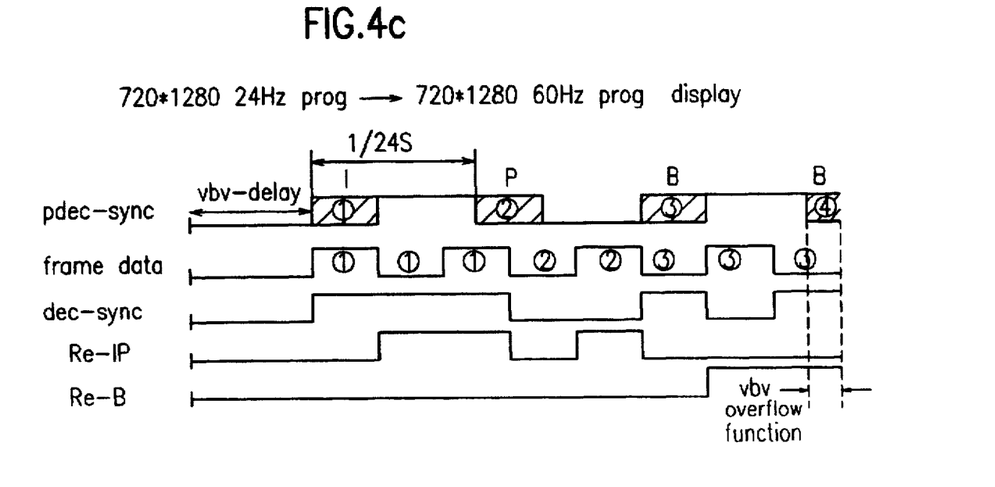

FIG. 4c illustrates a conversion from a [720×1280 24 Hz Prog] image format into a [720×1280 60 Hz Prog] display format of the frame data, wherein one frame is produced three times and the other frame is produced two times in response to a repetitive production signal Re-IP from the first controlling part. In converting the 24 Hz image format into 60 Hz image format, the production ratio of the two formats, i.e., the ratio of the received image format and the display image format is 2:5. In this instance, if the VBV buffer 36 should overflow, the A portion's additional memory is utilized. Also, in this case, the buffer size required for the format conversion part is 0, and the first selection signal is 0 and the second selection signal is 2.

Figure 4D:
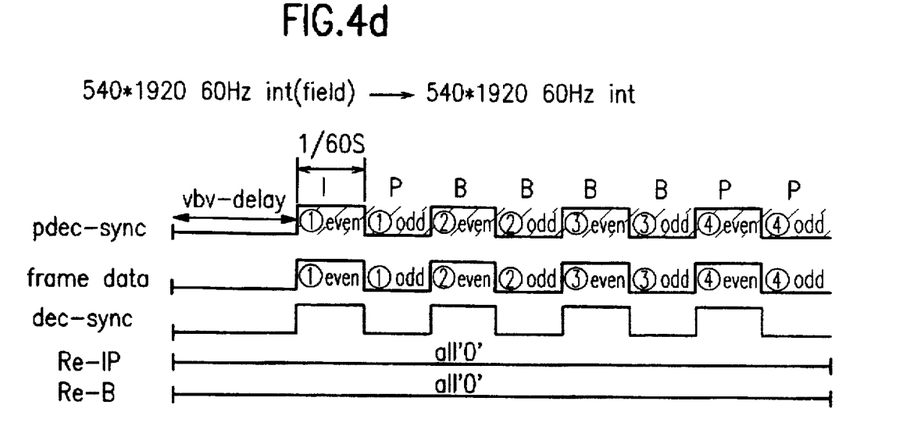

FIG. 4d illustrates a conversion from a [540×1920 60 Hz Int] image format into a [540×1920 60 Hz Int] display format of the frame data.

Figure 4E:
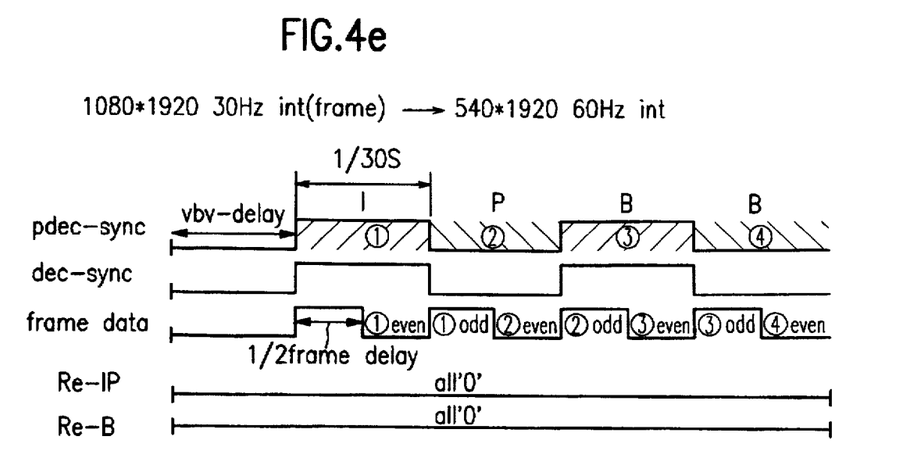

FIG. 4e illustrates a conversion from a [1080×1920 30 Hz Int] image format into a [540×1920 60 Hz Int] display format of the frame data.

Figure 4F:
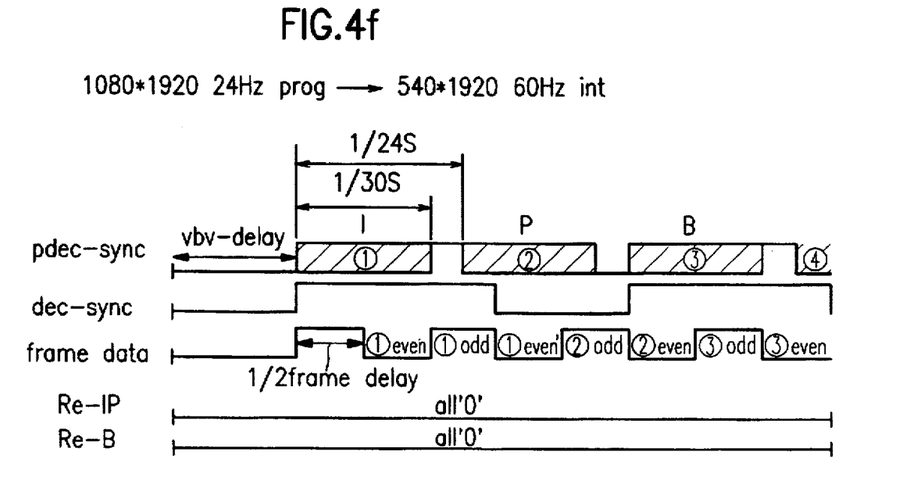

FIG. 4f illustrates a conversion from a [1080×1920 24 Hz Prog] image format into a [540×1920 60 Hz Int] display format of the frame data, wherein one decoding operation is omitted for every fourth display synchronizing signal, and the fourth storage part 41 is used for a progressive to interlaced conversion. Herein, the ⊕even portion is assumed by using the field converting part 46 from the (⊕odd portion which is stored in the ½ frame buffer 41 in advance. In this instance, the first selection signal is 0, and the second selection signal is 3 in the ⊕even section and 0 in rest of the sections.

Figure 4G:
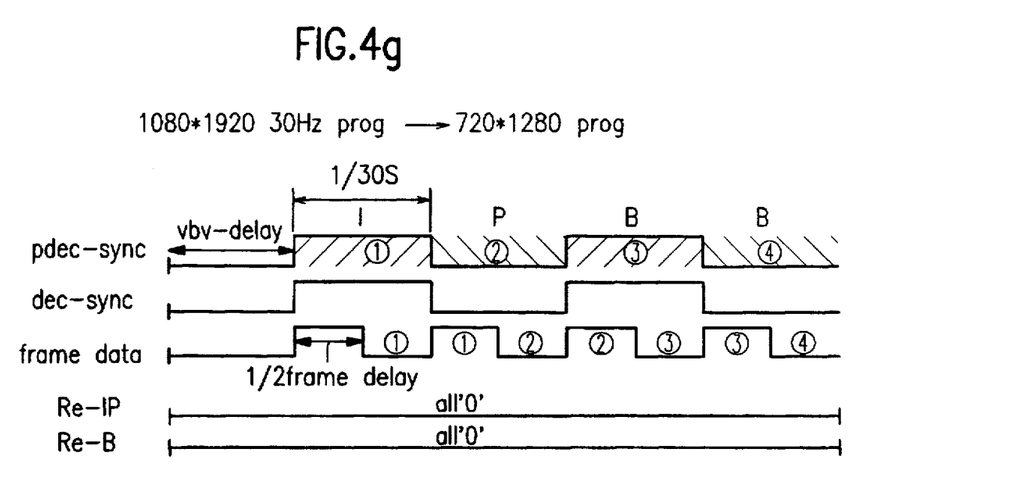

FIG. 4g illustrates a conversion from a [1080×1920 30 Hz Prog] image format into a [720×1280 60 Hz Prog] display format of the frame data, wherein the video decoding is conducted in a regular manner of which the output is converted into a [720×1280] display format by passing through the first horizontal converting part 39 and the first vertical converting part 40 of the format conversion part and stored in the fourth storage part 41, which is delayed by ½ frame. This operation is repeated in response to the next display synchronizing signal. Therefore, the size of the buffer required, in this case, is ½ the frame capacity. The first control signal in this case is 1, and the second control signal is 2.

Figure 4H:
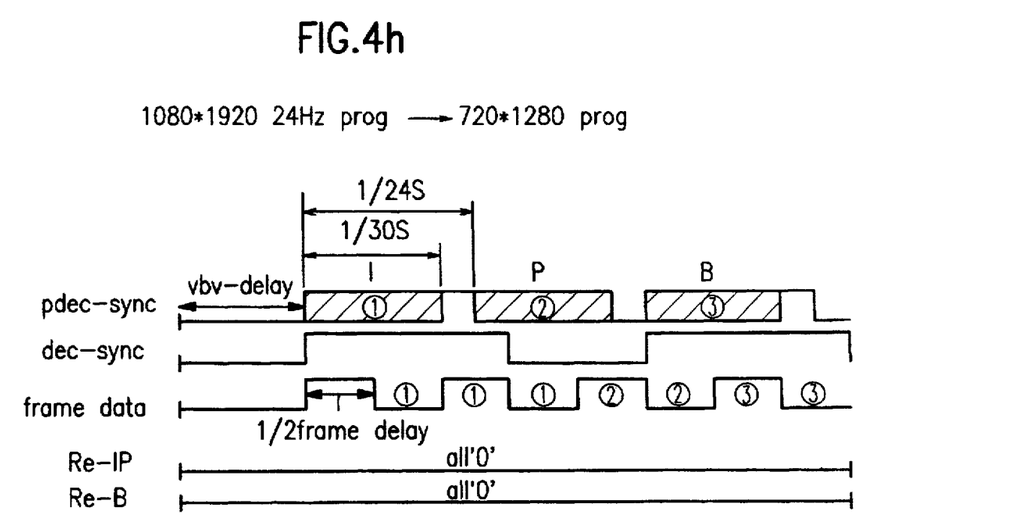

FIG. 4h illustrates a conversion from a [1080×1920 24 Hz Prog] image format into a [720×1280 60 Hz Prog] display format of the frame data, wherein the image format is converted into a [720×1280] frame size by passing through the horizontal converting part 39 and the vertical converting part 40, stored in the fourth storage part 41 and delayed by ½ frame, which is then produced repetitively in response to the repetitive production signal Re-IP from the first controlling part 30. Therefore, the size of a buffer required in this case is ½ the frame capacity. The first control signal in this case is 1, and the second control signal is 2.

In other words, in the method for decoding a digital video data of the present invention, decoding is carried out in a regular manner without any format conversion. For cases in which the information of the received video data format is identical to the information on the display format. In case the format information is not identical, the prior data recorded in the first storage part 36 is redecoded for a B frame case, and the decoding is conducted, in case of an I or P frame, by a repetitive production of the decoded prior frame video data in response to the repetitive production signal Re-IP from the first controlling part 30 in converting the frame rate to match the display format.

Since the device and method for decoding digital video data in accordance with the present invention allows the control of a decoding process to match the display format in decoding when converting a frame rate, the device and method of the present invention can reduce the size of the frame memory used in the format converting part, resulting in improvement in cost and system efficiency.

It will be apparent to those skilled in the art that various modifications and variations can be made in the method of fabricating a semiconductor device of the present invention without departing from the spirit or scope of the invention. Thus, it is intended that the present invention cover the modifications and variations of this invention provided they come within the scope of the appended claims and their equivalents.

What is claimed is:

1. A device for decoding digital video data comprising:
   a variable length decoder (VLD);
   an inverse discrete cosine transform (DCT) converting part;

a movement compensating part;

first storage means for repeated production of first video frame data responsive to a control signal display format;

second storage means for reordering and storing second video frame data produced by adding the data from the inverse DCT converting part and the movement compensating part repeatedly and repeated production of stored data in response to a control signal produced according to the display format;

switching means for selective production of the second video frame data, composed of reordered and repeated production of the first video frame data in response to a selection control signal;

controlling means providing control signals and display format information; and means for converting data to a picture size employing interlaced to progressive or progressive to interlaced conversion for producing frame data matched to the display format, the data having a frame rate thereof converted in the switching means in response to the format information from the controlling means and a synchronizing signal.

2. A device as claimed in claim 1, wherein the first video frame data is a B picture frame data.

3. A device as claimed in claim 1, wherein the second video frame data is an I or P picture frame data.

4. A device as claimed in claim 1, wherein the first storage means is a VBV (Video Buffering Verifier) buffer which stores B picture frame data and redecodes the B picture frame to match the frame conversion in response to a control signal from the controlling means.

5. A device as claimed in claim 1, wherein the second storage means includes, a first frame memory for storing I picture frame data in succession, and a second frame memory for storing P picture frame data in succession.

6. A device as claimed in claim 1, wherein the first storage means further includes a buffer for preventing overflow from occurring during redecoding of B picture frame data.

7. A device as claimed in claim 1, wherein the selection control signal is an I or P picture frame data repetitive production control signal.

8. A device as claimed in claim 1, wherein the means for converting data to a picture size employing interlaced to progressive or progressive to interlaced conversion includes, a first frame size converting part for converting to a frame size corresponding to frame rate converted frame data received from the switching means;

a first switching part procedure data selected from the frame size converted data and data from the switching means in response to the selection control signal;

a fourth storage part for the temporary storage and production from data selected by a second switching part in response to a production control signal;

a second frame size converting part converting the frame size of the frame data from a storage part according to a conversion format;

an interpolating part for interpolating the frame data being converted in the second frame size converting part;

a field converting part for interlaced to progressive or progressive to interlaced conversion of the frame data from the fourth storage part;

a third switching part producing a signal selected from a signal interpolated in the interpolating part, a signal from the fourth storage part and a signal from the field converting part in response to a selection control signal; and a controlling part for providing the selection control signal and the production control signal.

9. A device as claimed in claim 8, wherein the selection control signal is a selection signal for the display format information.

10. A device as claimed in claim 8, wherein the first frame size converting part includes, a first horizontal converting part for converting horizontal data of the frame data from the switching means; and a first vertical converting part for converting vertical data of a frame horizontal converted in the first horizontal converting part.

11. A device as claimed in claim 8, wherein the second frame size converting part includes, a second horizontal converting part for converting horizontal frame data of the data from the fourth storage part according to display format information; and a second vertical converting part for vertical conversion of vertical frame data of the data from the fourth storage part according to the display format information.

12. A device for decoding a digital video data, the device comprising:

a variable length decoder (VLD);

an inverse discrete cosine transform (DCT) converting part;

a movement compensating part;

a first controlling part for controlling the device to conduct a decoding operation;

a first storage part storing received video data in the VLD and repeated production of B picture frame data in response to a control signal produced according to display format information from the first controlling part;

second and third storage parts for storage and production of decoded data and repeated production of I or P picture frame data in response to a control signal produced according to the display format information from the first controlling part;

a first switching part for selective production of data reordered in the second and third storage parts according to decoding data from the inverse DCT converting part and the movement compensating part and a control signal from the first controlling part; and a format conversion part for subjecting data to a picture size conversion and interlaced to progressive or progressive to interlaced conversion for producing frame data matched to a display format, the data having a frame rate thereof converted in the first switching part in response to the display format information from the first controlling part and a synchronizing signal from the format conversion part.

13. A device as claimed in claim 12, wherein the first storage part further includes a buffer for preventing overflow during redecoding.

14. A device as claimed in claim 12, wherein the first storage part is a VBV (Video Buffering Verifier) buffer which stores the B picture frame data and redecodes the B picture frame data to match the frame conversion in response to a control signal from the first controlling part.

15. A device as claimed in claim 12, wherein the format conversion part includes, a first frame size converting part for converting to a frame size corresponding to frame data received from the first switching part according to a conversion format;

a second switching part for production of data selected from converted frame size data and the data from the first switching part in response to the control signal;

a fourth storage part for temporary storage and production of data selected at the second switching part in response to an production control signal;

a second frame size converting part for converting to a frame size corresponding to frame data from the fourth storage part according to a conversion format;

an interpolating part for interpolating frame data converted in the second frame size converting part;

a field converting part for interlaced to progressive or progressive to interlaced conversion of frame data from the fourth storage part;

a third switching part for production of a signal selected from a signal interpolated in the interpolating part, a signal from the fourth storage part and a signal from the field converting part in response to a selection control signal; and a controlling part for providing the selection control signal and the production control signal.

16. A device as claimed in claim 15, wherein the selection control signal is a selection signal for the display format information.

17. A device as claimed in claim 15, wherein the first frame size converting part includes, a first horizontal converting part for converting horizontal data of the frame data from the first switching part; and a vertical converting part for converting vertical data of the frame horizontal data converted in the first horizontal converting part.

18. A device as claimed in claim 15, wherein the second frame size converting part includes, a second horizontal converting part for converting horizontal frame data of frame data from the fourth storage part according to display format information; and a second vertical converting part for vertical conversion of vertical frame data of frame data from the fourth storage part according to display format information.

19. A method for decoding digital video data in a decoding device having a video buffering verified (VBV) buffer and a frame memory, the method comprising the steps of:

comparing an image format of received video data and a display image format;

re-decoding frame data from the VBV buffer when found to be a B picture frame as a result of the comparison in response to an production controlling signal;

repeating production of a prior frame data decoded and stored in the frame memory when an I or P picture frame determination is the result of the comparison; and converting frame rate data of the resulting frame data to match the display image format.

20. A method as claimed in claim 19, wherein, when the received video data format information and the display format information are identical, a regular decoding operation is conducted.

21. A method as claimed in claim 19, wherein the step of converting frame rate of the produced frame data includes the steps of;

converting frame size data of the frame rate converted data;

selecting data from the frame size converted data and the frame rate converted data and temporarily storing the data in the frame memory in response to a selection control signal, and producing the data in response to a production control signal;

conducting an interlaced to progressive or progressive to interlaced conversion of the frame data by converting frame size of the frame data from the frame memory according to a conversion format and interpolating the converted frame data; and producing and displaying frame data selected from the frame data having been interlaced to progressive or progressive to interlaced converted and the frame size converted frame data according to a selection control signal.

22. A method as claimed in claim 21, wherein the selection control signal is a selection signal for the display format information.

23. A method as claimed in claim 21, wherein the frame size conversion is a conversion of horizontal data or vertical data of the frame data according to the display format information.

24. A method for decoding digital video data in a digital video data decoding device having a variable length decoder (VLD), an inverse discrete cosine transform (DCT) converting part and movement compensating part, the method comprising the steps of:

temporary storage and repeated production of a first video frame data in response to a control signal produced according to display format information;

reordering and storing second video frame data which is added data of the data from the inverse DCT converting part and the movement compensating part and repeated production of the stored data in succession in response to a control signal produced according to a display format when original image format information is not in conformity with the display image format information;

producing video frame data selected from the first video frame data and the reordered and repeatedly and successively produced second video frame data, in response to a selection control signal in conversion of a frame rate; and subjecting the selected, produced and frame rate converted data to a frame size conversion and interlaced to progressive or progressive to interlaced conversion according to a synchronizing signal at a format conversion and the display format information for producing frame data matched to the display format.

25. A method as claimed in claim 24, wherein the first video frame data is B picture frame data.

26. A method as claimed in claim 24, wherein the second video frame data is an I or P picture frame data.

27. A method as claimed in claim 24, wherein the selection control signal is an I or P frame data repeated production control signal.

* * * * *